United States Patent Office 3,432,459
Patented Mar. 11, 1969

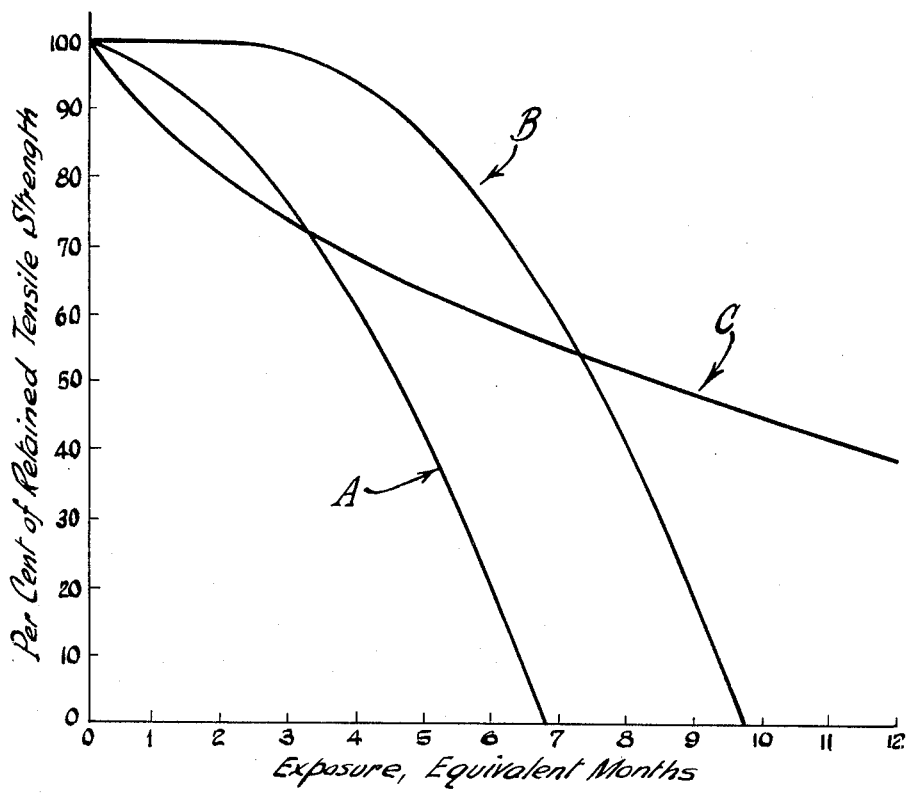

3,432,459
STABILIZABLE POLY-α-OLEFIN INTERMEDIATES
Gregory J. Listner, Franklin Park, N.J., assignor to Johnson & Johnson, a corporation of New Jersey
Continuation-in-part of application Ser. No. 293,823, July 9, 1963. This application Jan. 31, 1964, Ser. No. 341,614
U.S. Cl. 260—33.8     7 Claims
Int. Cl. C08f 29/02, 45/58

ABSTRACT OF THE DISCLOSURE

An intermediate poly-α-olefin composition containing a chlorinated polyphenyl compound and thus adapted to receive significant amounts of anti-oxidants, ultra violet light absorbers and other stabilizers

---

This application is a continuation-in-part of application S.N. 293,823 filed July 9, 1963, now U.S. Patent 3,277,046 issued Oct. 4, 1966.

By the term "α-olefins" as used herein, applicant means olefins having substantially all of the unsaturation in the α position and further limited to those olefins wherein the resultant polymerizate is a self-supporting structure.

The polymers of α-olefins and like ethylenically unsaturated materials, particularly polyethylene and polypropylene of the low, medium and high density varieties, have many desirable characteristics which make them useful in a wide variety of molded and shaped products. These characteristics include their thermoplastic nature, which allows for easy molding, shaping, extruding, fabricating, etc., their inertness and other controllable physical and chemical properties.

Despite these desirable characteristics, thermoplastic poly-α-olefins have been limited in use in certain areas and have been excluded from others because of their tendency to become brittle, form powder on their surfaces, lose strength and darken in color on exposure to light and weathering as is normally encountered in outdoor uses.

Thus, moldings, monofilaments, multifilaments, fibers, sheets, films and other sections derived from these polymers have a very limited useful life in outdoor applications where exposure to sunlight and oxygen of the air occurs for prolonged periods of time. In such environments, these polymers degrade very rapidly resulting in virtually complete loss of required mechanical properties such as tensile strength, elongation, tear strength, abrasion resistance, etc. As a consequence, the products derived from the polymers have only very limited utility in a vast range of uses, including shade cloth, seed bed covers, sailcloth, automotive upholstery fabrics, rope and cord, boat covers, construction projects, signs, etc.

Certain additives have been employed in the past to overcome this sunlight degradation. One such treatment is incorporating finely dispersed carbon black particles in the polymer but this of course conveys a black color to any article so treated. Some of the other substances used also impart dark colors to the polymer or result in opacity, or in other ways impair the properties of the final product.

Proposals have been made to incorporate various antioxidants and various ultra-violet light-absorbing materials into the polymer, or combinations of these two, but the anti-oxidants normally employed are rapidly consumed during the decomposition of the polymer due to weathering and the ultra-violet absorbents are only active for short durations due to the decomposition of the absorbing material or because they migrate to the surface of the polymer and are volatilized. Furthermore, compatibility of various absorbers and anti-oxidants with the olefin polymers is very limited.

I have now discovered that poly-α-olefins can be made more receptive to the addition of stabilizers, i.e., become preconditioned to the acceptance of stabilizers, by the incorporation into the poly-α-olefin of from about 1% to about 30% by weight of a chlorinated polyphenyl compound having from about 20% to about 70% chlorine by weight.

Thus, this invention includes an easily stabilizable intermediate in the stabilization of poly-α-olefins which comprises a poly-α-olefin and from about 1% to about 30% by weight of a chlorinated polyphenyl compound, having from about 20% to about 70% chlorine by weight, selected from the group consisting of chlorinated biphenyl, chlorinated triphenyl and blends of chlorinated bipheny and chlorinated triphenyl.

By the term "easily stabilizable" as used herein is meant that the presence of from about 1% to about 30% of the chlorinated polyphenyl compound in the poly-α-olefin insures that effective stabilizer additives, e.g. ultra-violet light absorbers, anti-oxidants and heat absorbers, will be readily accepted, and readily distributed through the poly-α-olefin in amounts, and to degrees, which have not been possible in the past.

The term "effective stabilizer additives" as used herein defines poly-α-olefin compatible ultra-violet light absorbers which block damaging ultra-violet light, heat stabilizers and anti-oxidants which are poly-α-olefin compatible, which have heat and color stability and which act as peroxide scavengers. The term "effective stabilizer additives" is also meant to include, by definition, additives which are poly-α-olefin compatible and which have a synergistic effect on the performance of the anti-oxidants, i.e., combine with the anti-oxidants to give increased performance. Examples of these additives are distearyl and di-lauryl-thiodipropionate as well as a dialkyl phenol sulfide, "Sterobane 20."

The present discovery includes a stabilized polyolefinic shaped article comprising a poly-α-olefin, from about 1% to about 30% by weight of a chlorinated polyphenyl compound, having from about 20% to about 70% chlorine by weight, selected from the group consisting of chlorinated biphenyl and chlorinated triphenyl, and from about ¼% to about 10% by weight of effective stabilizer additives.

The chlorinated polyphenyl compounds which may be used in accordance with the present invention are any of the biphenyl or triphenyl compounds containing from about 20% to 70% by weight of chlorine or blends of chlorinated biphenyls and triphenyls containing from about 20% to 70% chlorine. Suitable examples of such chlorinated polyphenyl compounds are chlorinated biphenyl containing 60% by weight chlorine, chlorinated triphenyl containing 60% by weight chlorine, and a blend of chlorinated triphenyl and chlorinated biphenyl containing 65% by weight chlorine, etc.

The chlorinated polyphenyl compounds are incorporated into the polymer in an amount sufficient to provide from about 1% to about 30% or more by weight, in the final polymer; 5% to 25% being preferred. If less than about 1% of the chlorinated polyphenyl is used in the compositions of the present invention there is little enhancement of the stability of the polyolefin. Whereas, if more than about 30% of the chlorinated polyphenyl is used the resultant polyolefin material becomes tacky at elevated temperatures. In addition to markedly increasing the resistance to degradation of the polymeric composition the chlorinated polyphenyl compounds increase the melt flow range of the polymer during extrusion.

The presence of the chlorinated polyphenyl in the poly-α-olefin enables or facilitates the addition of stabilizers into the poly-α-olefins in amounts which have not been possible before with any beneficial effect since prior to this invention the stabilizers have just not been readily accepted by the poly-α-olefin in more than very minor amounts which are considerably below the amounts now made possible. Also the distribution of that stabilizer that was incorporated into the polymer was not satisfactory in most cases. By reason of the instant invention, the poly-α-olefins can be made receptive to certain stabilizer additives in amounts sufficient to greatly improve their resistance to heat and ultra-violet light degradation. Additionally, the dispersion of these additives within the polymer is very good; therefore, uniform performance is effected.

The improved poly-α-olefins of the present invention retain a considerable portion of their tensile strength for long periods of time. They also retain a portion of their elongation after lengthy exposures to sun and weather. Furthermore, the improved compositions of the present invention stop powdering on the surface of poly-α-olefins which are exposed to sun and weather.

The effective stabilizer additives have been defined quite generally. In the preferred embodiment of this invention the presence of an anti-oxidant, an utlra-violet light absorber and a member of the group which combines with the anti-oxidant to give improved performance are all present together with the chlorinated polyphenyl compound; however, due to the nature of the chlorinated polyphenyl compound and to the increased receptivity to stabilizer additives which it effects in the poly-α-olefins, the presence of all three of these effective stabilizer additives is not necessary in order to obtain improved results. The presence of two, or even one, provided the chlorinated polyphenyl is there to condition the poly-α-olefin, will effect results superior to those which presently exist with respect to heat and ultra-violet light degradation of the polymer; however, the most improvement in these features is evidenced when a member of each of the constituents of the effective stabilizer additives is present.

In considering the ultra-violet absorbers, concern is manifested in that portion of the sunlight spectrum, i.e., the ultra-violet energy, which is sufficiently powerful to rupture chemical bonds or, in other words, sufficiently powerful to cause photochemical degradation of the polyolefinic shaped article. In the system of this invention the ultra-violet absorbers must be limited to those which are compatible with the particular poly-α-olefins defined herein. These are represented by p-octylphenyl salicylate; 2-hydroxy-4-n-octoxybenzophenone; AT539, i.e. a substituted acrylonitrile; AM101, i.e. a nickel organic complex; and tert-butyl salicylate. The ultra-violet absorber may be present in an amount from about 0.0% to about 5% by weight in the finished product. When the existence of the effect of the ultra-violet light absorber is desired, from about 0.25% to about 5% by weight are acceptable limitations. If no ultra-violet light absorber is present in the system, the end results while considerably improved insofar as the resistance to heat and light degradation of the poly-α-olefin is concerned, are not as greatly improved as they are when the ultra-violet light absorber is present.

The anti-oxidants contemplated in the system of this invention must also be compatible with the poly-α-olefins at extrusion temperature and at service temperatures, i.e., they must be non-exuding, but they must also have sufficient heat stability at extrusion temperature to permit the extrusion of the polyolefin composition. They must also possess color stability such that there is little or no color change during, or after, extrusion or during the reasonable life of the polymer. They must also possess excellent water resistance so that moisture will not leach it from the final product, thereby destroying the tensile strength and oxidation resistance which are desired. Representative of anti-oxidants which fall within this definition are 2,6-ditertiarybutyl-p-cresol; RA–1093; "Irganox 858"; "Irganox 1076"; "Irganox 1093"; "Santanox," i.e. a dialkyl phenol sulfide; "Topanol C.A.," i.e. a 3:1 condensate of 3-methyl-6-tertiary butylphenol with crotonaldehyde; "Nonox WSP"; "Nonox CL"; "Antioxidant 2246"; "Antioxidant 425"; "Antioxidant 703"; 2,4,5-tri-hydroxy-butyrophenone and butylated hydroxytoluene.

These anti-oxidants must be present in amount sufficient to insure a content of from about 0.05 to about 2% by weight, in the final polymer; however, within the more commercial aspects of the present invention the use of from about 0.25% to about 0.5% by weight is contemplated.

The fourth additive is represented by di-lauryl-thiodipropionate, di-stearyl-thiodipropionate, or "Sterobane 20," a modified polymeric thioester in an amount sufficient to provide from about 0.05% to about 2% by weight in the final polymer. From about 0.1% to about 0.5% by weight, is preferred. This particular additive is necessary since it is synergistically reactive with the anti-oxidant and it imparts heat stability to the final poly-α-olefinic shaped article, i.e., a film, filament, extrudate or molded article of manufacture.

Heat stabilizers compatible with the poly-α-olefin and which exhibit good resistance to heat during extrusion may also be added to the system provided that they are non-migrating.

The easily stabilizable intermediates of this invention are prepared by (A) Mixing a particulate poly-α-olefin and a chlorinated polyphenyl solution in an amount sufficient to provide from about 1% to about 30% by weight add-on of chlorinated polyphenyl, and (B) Baking said mixture at a temperature of from about 150° F. to about 300° F. for a period of from about ½ hour to about 8 hours whereby the poly-α-olefin uniformly absorbs said chlorinated polyphenyl composition.

Of course, this may also be accomplished by coating a poly-α-olefin shaped article with sufficient chlorinated polyphenyl to insure from about 1% to about 30% by weight add-on followed by the baking step.

Polyolefinic shaped articles stabilized as to heat and ultra-violet light degradation and having improved feel and pleasing hand without sacrifice of the desirable strength properties are provided by the method which comprises:

(A) Dissolving (a) from about 0.0% to about 5% by weight of a poly-α-olefinic compatible ultra-violet absorber composition, (b) from about 0.05% to 2% by weight of a poly-α-olefinic compatible anti-oxidant exhibiting heat and color stability, and, (c) from about 0.05% to about 2% by weight of a member selected from the group consisting of a dialkyl phenol sulfide, di-lauryl thiodipropionate, and di-stearyl thiodipropionate in a chlorinated polyphenyl compound to form a solution, (B) Mixing said solution with a poly-α-olefin polymer, (C) Heating said mixture to a temperature of from about 150° F. to about 300° F. for a period of from about ½ hour to about 8 hours whereby the poly-α-olefin uniformly absorbs said solution, and (D) Forming said mixture into a shaped article, said article having improved resistance to both heat and ultra-violet light degradation.

The heating step, i.e., step C above, is of paramount importance in either the process for preparing the intermediate or in the process for preparing, at one time, the stabilized polyolefin, since the absence of this heating or baking of the mixture at this stage will effect unsatisfactory results in that the distribution of the additives in the polymer will not be complete. This would affect the uniformity of performance to a point where the polymer composition is not extrudable in an acceptable fashion because of plating out. Also, in instances where some extrusion is possible, the performance of the final product would be highly variable since, as stated, the additives are not uniformly distributed throughout the polymer.

Below 150° F., the absorption of the additives into the polymer is very slow and therefore impracticable. At temperatures higher than about 300° F., although absorption is very rapid, softening or premature melting of the polymer mass takes place. Of course it is realized that this maximum temperature may fluctuate depending upon the poly-α-olefin used.

In extruding poly-α-olefin materials to form filaments, the poly-α-olefin should have a narrow range of melt flow rate in order to obtain continuous, uniform formation of the filament and to preclude lumping. Usually for polypropylene the melt flow rate will be around 4.0 and will vary very little from this figure. However, when the compositions of the present invention are incorporated in the poly-α-olefin material the criticality of the melt flow rate is removed and poly-α-olefin materials having varying melt flow rates and broad ranges of melt flow rates may be extruded continuously and uniformly into filaments. For example, I have found that I may extrude polypropylene having a melt flow rate ranging from 3 to 7 into commercially acceptable filaments when the composition of the present invention is incorporated with the polypropylene prior to extrusion.

As previously mentioned poly-α-olefinic additives very often reduce the clarity of the olefinic material and make it milky or opaque. However, when using the compositions of the present invention the poly-α-olefinic materials lose none of their original clarity and if desired, their clarity may be improved by the addition of up to 5% of mineral oil to the compositions of the present invention. Addition of such minor amounts of mineral oil produces a crystal clear poly-α-olefin material which maintains its clarity even after lengthy exposures to sun and weather. I have established that if mineral oil is added to a polyolefinic system without the inclusion of the additives described herein, it, the mineral oil, is compatible with the polyolefinic material only when it is hot or thermoplastic; however, it separates out, i.e., it exudes from the polymer on cooling and solidification of the polymer composition, thus not only resulting in a milky colored polymer but also reducing the tensile strength of the polymer.

The incorporation of the additives into the polymer can be done by any one of several methods that insure uniform distribution. For example, if the chlorinated polyphenyl compound is a liquid the other compounds may be dissolved in the chlorinated polyphenyl compound and the combinations then mixed with warm polymer, or if all the compounds are solids they may be mixed by hot milling such as a two-roll heated mill or by melting of the additives together and coating this mixture uniformly on the small pellet particles of the warm polymer, allowing the mixture to cool after thorough mixing, or by dissolving the additives in solvents such as xylene and toluene and then mixing with the polymer in powder, flake or pellet form. Other methods of blending the components may also be employed, such as extrusion mixing, etc.

In most instances it is difficult to uniformly disperse additives in the poly-α-olefin polymer. It is believed that this is caused by the fact that a true solution is not formed but that the additive molecules simply disperse themselves, at random, in and amongst the olefin molecules.

I have discovered that the compositions of the present invention may also be readily incorporated into poly-α-olefin polymers with extreme uniformity by first dissolving (A) from about 0.0% to about 13% by weight of a poly-α-olefin compatible ultra-violet light absorber, (B) from about 0.1% to about 5% by weight of a poly-α-olefin compatible anti-oxidant exhibiting heat and color stability, and (C) from about 0.1% to about 5% by weight of a member selected from the group consisting of a dialkyl phenol sulfide, di-lauryl thiodipropionate and distearyl thiodipropionate, into (D) from about 2.5% to about 77% by weight of a warm chlorinated polyphenyl compound, having from about 20% to about 70% chlorine by weight, selected from the group consisting of chlorinated biphenyl, chlorinated triphenyl and blends of chlorinated biphenyl and chlorinated triphenyl. An organic solvent compatible with the system may be added to facilitate ease of application of this coating composition onto the poly-α-olefin structure. The chlorinated polyphenyl solution is poured over the poly-α-olefin polymer which has been pre-warmed to a temperature of from about 100° F. to about 275° F. or higher but not as high as the melting point of the olefin polymer. The olefin polymer coated with the chlorinated polyphenyl solution is baked at a temperature of from about 150° F. to 300° F. for a period of from about ½ hour to 8 hours or more and the poly-α-olefin polymer uniformly absorbs the chlorinated polyphenyl solution. The amount of add-on of the coating composition should be within the range of 1% to 30%, or preferably within the range of 5% to 25%, measured in terms of the amount of chlorinated polyphenyl constituent taken up or absorbed by the poly-α-olefin composition.

The quantity of each of the additives to be employed will in general depend upon the amount of stability required. Certain important limits have been defined to obtain the maximum effect, however.

The normal procedure in evaluating the light stability of olefinic materials has been to expose samples of film, filament, fabric, or other forms to outdoor sunlight and weathering in a location where the annual amount of sunlight is very high, such as in southern Florida or Arizona. Thus, measurement of exposure used herein is directly related to exposure to weather conditions found in these two States.

Although the principles of the present invention are being described with particular reference to isotactic polypropylene as the preferred poly-α-olefin, it is to be appreciated that the practice of the invention is beneficial to other poly-α-olefins, notably polyethylene. It is also to be noted that the invention is applicable to copolymers or polyallomers of poly-α-olefins either of different species of the same poly-α-olefin, such as a blend of low molecular weight polyethylene and high molecular weight polyethylene or of different poly-α-olefins such as polyethylene-polypropylene, polyethylene-polybutylene, etc. In its broader aspects the invention is thus applicable to any poly-α-olefin or to mixtures of or combinations thereof in the form of blends, copolymers, polyallomers, etc., which are susceptible to light-induced degradation.

Referring to the drawing, there is shown in the figure a graph wherein the percent retained tensile strength of monofilaments is plotted against the equivalent months of exposure to weather in Arizona and Florida. In all instances the filament size and other characteristics except additives are the same, and the filaments are tested under fabric conditions at temperatures of 75° C. to 80° C. Plotted on the graph are the determinations for (A) a 100% polypropylene filament, (B) a polypropylene filament stabilized with a composition of p-octylphenyl salicylate, di-lauryl-thiodipropionate, and 2,6-di-tertiarybutyl-p-cresol, and (C) a polypropylene filament containing a composition of the present invention, i.e., p-octylphenyl salicylate, di-lauryl thiodipropionate, 2,6-di-tertiarybutyl-p-cresol and chlorinated biphenyl. As can be seen from the graph, not only does the composition of the present invention, i.e., composition (C), drastically increase the percent retained tensile strength of the polypropylene filament after considerable exposure, but in fact completely changes the slope and configuration of the curve. Polypropylene by itself degrades extremely rapidly after 2 to 3 months' exposure and polypropylene containing some stabilizer degrades very rapidly during the 6th to 9th or 10th month of exposure. The filaments of the present invention, even after 10 months of exposure, degrade slowly and maintain a higher percent of their tensile strength after a considerably longer exposure than previous type stabilized polyolefin filaments.

The invention will be further illustrated in greater detail by the following specific examples. It should be understood, however, that although these examples may describe in particular detail some of the more specific features of the invention they are given primarily for purposes of illustration and the invention in its broader aspects is not to be construed as limited thereto.

Example 1

A mixture of 1 pound of p-octylphenyl salicylate, ½ pound 2,6-di-tertiarybutyl-p-cresol and ½ pound di-lauryl thiodipropionate is melted on a steam bath and then tumbled with 100 pounds of isotactic polypropylene pellets (a general purpose UV-unstabilized extrusion resin) which is warmed to about 120° F. The tumbled material is allowed to cool to room temperature. The pellets, uniformly coated with the additive mixture, are then baked at 250° F. for 2 hours and extruded through a 1-inch laboratory extruder into 19 x 85 mil size monofilaments, quenched in cold water, and oriented 6:1 to give 9 x 30 mil size monofilaments. The monofilaments are exposed to an equivalent of 8 months' Florida exposure, 9 months' Florida exposure and 10 months' Florida exposure. At the end of each period the monofilaments are tested to determine the retained tensile strength as a percentage of the equivalent original tensile strength. After 8 months' exposure the retained tensile strength is 42%, after 10 months it is approximately 15%. After 12.5 months it failed.

Example 2

A mixture of 1 pound of (A) p-octylphenyl salicylate, ½ pound (B) 2,6-di-tertiarybutyl-p-cresol and ½ pound (C) di-lauryl thiodipropionate is dissolved in 10 pounds of warm (D) chlorinated biphenyl containing 60% by weight chlorine. 100 pounds of isotactic polypropylene pellets are warmed to about 120° F. and the above mixture poured over the heated pellets with mixing to coat each pellet. The coated pellets are heated for two (2) hours at a temperature of 220° F. and the chlorinated biphenyl solution is uniformly absorbed by the polypropylene pellets. The material is allowed to cool to room temperature and the pellets obtained are dry and free flowing. The pellets are extruded as described in Example 1 to form 9 x 30 mil size monofilaments. The monofilaments are exposed to an equivalent of 8 months' Florida exposure, 9 months' Florida exposure and 10 months' exposure. At the end of this period the monofilaments are tested to determine the retained tensile strength as a percentage of the original tensile strength. The retained tensile strength after 8 months' exposure is 53%, after 9 months' exposure it is 48%, and after 10 months' exposure it is 45%. In this instance the composition of the present invention after 8 months' equivalent exposure retained approximately the same amount of tensile strength as did the composition of Example 1. After 9, 10 and more months of exposure the decrease in retained tensile is gradual while in the composition of Example 1 the retained tensile of the filament after 10 months' equivalent exposure is virtually nil.

The filament of this example is also tested for percent retained elongation after 9 months' equivalent Florida exposure and is found to retain 42% of its original elongation.

Example 3

The procedure set forth in Example 2 is followed with the exception that the mixture contains 2 pounds p-octyl-phenyl salicylate, 1 pound 2,6-di-tertiarybutyl-p-cresol, ½ pound di-lauryl thiodipropionate, and 10 pounds of the chlorinated biphenyl and 100 pounds of polypropylene pellets. The extruded monofilaments are tested after 8, 9 and 10 months' equivalent exposure. The retained tensile strength is found to be 58% after 8 months, 56% after 9 months, and 53% after 10 months. After 9 months' equivalent exposure the percent retained elongation of this filament is found to be 45%.

Example 4

10 pounds of chlorinated biphenyl containing 60% by weight chlorine is warmed and mixed with 100 pounds isotactic polypropylene pellets. The mixture is heated and extruded to form a 9 x 30 mil monofilament as described in Example 2. The extruded monofilament is tested after 8 and 10 months' equivalent exposure and the retained tensile is found to be 17% after 8 months and 8% after 10 months. The percent of retained elongation of this filament after 10 months' equivalent exposure is found to be only 4%. This is a complete failure of the monofilament.

Example 5

The procedure set forth in Example 2 is followed with the exception that 4.5 pounds p-octylphenyl salicylate, 2 pounds 2,6-di-tertiarybutyl-p-cresol, 3 pounds di-lauryl thiodipropionate, and 20 pounds chlorinated triphenyl containing 60% by weight chlorine are mixed with 100 pounds of isotactic polypropylene pellets and extruded. The extruded monofilaments are tested after 8 and 10 months' equivalent exposure and the retained tensile strengths are found to be 60% after 8 months and 56% after 10 months.

Example 6

The procedure set forth in Example 2 is followed with the exception that ½ pound p-octylphenyl salicylate, ¼ pound 2,6-di-tertiarybutyl-p-cresol, ¼ pound di-lauryl thiodipropionate, and 7 pounds of a mixture of chlorinated biphenyl and chlorinated triphenyl containing 65% by weight chlorine are mixed with 100 pounds of isotactic polypropylene pellets and extruded. The extruded monofilaments are tested after 8 and 10 months' equivalent exposure and the retained tensile strengths are found to be 51% after 8 months and 42% after 10 months.

Example 7

A base resin of a UV stabilized polyethylene-polypropylene-polyallomer, which is a block copolymer of stereo-regular ethylene units distributed through isotactic polypropylene, is extruded into 9 x 30 mil diameter monofilaments without the addition of any stabilizing additives. At the end of 8 months' equivalent exposure to Arizona heat and sunlight, the retained tensile strength of a monofilament is determined to be less than 4% of the original tensile strength and the retained elongation is found to be less than 8% of the original elongation. This is a complete failure of the filament.

Example 8

The procedure of Example 2 is followed with the exception that 100 pounds of a polyethylene-polypropylene-polyallomer is substituted for the isotactic polypropylene. The extruded monofilaments are tested after 8, 9 and 10 months' equivalent exposure and the retained tensile after 8 months is 62%, after 9 months it is 56%, and after 10 months it is 52%, as contrasted to the 4% value obtained for the base resin.

Following the procedure of Example 2, the following examples were performed wherein the constituent parts of the stabilizing composition are designated by the letters A, B, C and D which correspond to the same category of constituents having like letter designations in Example 2. All weights are given in parts by weight as compared to the total weight of the polymeric mixture.

| Example | Poly-olefin | (A) | (B) | (C) | (D) | Percent retained tensile | | |
|---|---|---|---|---|---|---|---|---|
| | | | | | | 8 months | 10 months | 12.5 months |
| 9 | 500 parts of isotactic polypropylene pellets. | 5 parts p-octylphenyl salicylate (OPS). | 2.5 parts 2,6-ditertiarybutyl-p-cresol (DBPC). | 2.5 parts di-laurylthiodipropionate (DLTDP). | 50 parts chlorinated biphenyl.* | 54 | 48 | 44 |
| 10 | do | | 5.0 parts (DBPC) | 5.0 parts (DLTDP) | do | 40 | 38 | 25 |
| 11 | do | 5.0 parts U.V. 531 | 1.0 part (DBPC) | 1.0 distearyl-thiodipropionate (DSTDP). | do | 58 | | 28 |
| 12 | do | do | 1.0 part "Topanol CA." | 1.0 part "Sterobane 20." | do | 63 | | 38 |
| 13 | do | 2.5 parts AT 539 | 2.5 parts DBPC | 2.5 parts DLTDP | do | 55 | | 29 |

*Containing 60% by weight chlorine.

Example 14

A mixture of forty grams of p-octylphenyl salicylate, 20 grams of 2,6-di-tertiarybutyl-p-cresol and 10 grams of di-lauryl thiodipropionate is dissolved in 1200 grams of chlorinated biphenyl containing 60% by weight chlorine. 675 grams of xylene is added as a solvent in order to facilitate the ease of application of this coating composition. A polypropylene mesh fabric which has been pre-warmed to a temperature less than 250° F. is immersed in this solution, removed and baked at 250° F. for 5 minutes. This immersion and baking is once repeated. The percent add-on is 5.3%. The resultant coated polypropylene fabric is then exposed to the equivalent of 8.3 months of sunlight and heat in Arizona and the fabric remained intact.

Example 15

A mixture of 15 parts of p-octylphenyl salicylate, 2.5 parts "Sterobane 20," and 2.5 parts 2,6-di-tertiarybutyl-p-cresol is dissolved in 150 parts of warm chlorinated biphenyl containing 60% by weight chlorine. 500 parts of "Profax 6623" a flaked polypropylene resin sold by Hercules Powder Company is warmed to about 120° F. and the above mixture is poured over the heated resin flakes. The coated flakes are heated for two (2) hours at a temperature of about 220° F. and the chlorinated biphenyl solution is uniformly absorbed by the polypropylene flakes. The material is allowed to cool to room temperature and the flakes obtained are dry and individually unrestrained. The flakes are extruded following the procedure of Example 1 to form 9 x 30 mil size monofilaments. The monofilaments are exposed to an equivalent of 6.9 months, 10 months and 12 months Florida exposure. At the end of these periods the monofilaments were tested to determine the retained tensile strength as a percentage of the original tensile strength. After 6.9 months the retained tensile was 88%, after 10 months 80% and after 12 months 79%. The percent retained elongation over the same periods was 69%, 59% and 53% respectively. A control run concurrently reflected 15% retained tensile and 14% retained elongation after 6.9 months.

Example 16

Example 15 was repeated with the lone exception that AT–539 was substituted for p-octylphenyl salicylate. Monofilaments were prepared and tested over the same time period under equivalent conditions. After 6.9 months the retained tensile was 86%, after 10 months 82% and after 12 months 76%. The retained elongation over the same periods was 73%, 63% and 57% respectively.

Example 17

A mixture of 5 parts p-octylphenyl salicylate, 2.5 parts 2,6-di-tertiarybutyl-p-cresol and 2.5 parts di-lauryl thiodipropionate is dissolved in 150 parts of warm chlorinated biphenyl containing 60% by weight chlorine. 500 parts of "Avisun X–100," a polypropylene resin manufactured by Avisun Corporation, is warmed to 120° F. and the procedure of Example 15 is followed. The retained tensile of the monofilaments was measured over periods of 8 months, 10 months and 12.5 months and found to be 54%, 48% and 44%. The retained elongation measured over the same periods was found to be 50%, 41% and 36% respectively. A control of "Avisun X–100" failed at 8 months.

Example 18

Example 17 was repeated with the exception that the amount of p-octylphenyl salicylate present was 2.5 parts and the amount of di-lauryl thiodipropionate present was 5 parts. Measurements of the monofilaments was taken over the same time period with the resultant retained tensile measured at 54%, 52% and 42% respectively and the retained elongation measured at 39%, 35% and 30% respectively.

Although several specific examples of the inventive concept have been described the same should not be construed as limited thereby nor to the specific features mentioned therein but to include various other equivalent features as set forth in the claims appended hereto. It is understood that any suitable changes, modifications and variations may be made without departing from the spirit and scope of the invention.

What is claimed is:

1. An easily stabilized intermediate for the preparation of intermediate poly-α-olefin compositions which consists of a poly-α-olefin and from about 1% to about 30% by weight of a chlorinated polyphenyl compound, having from about 20% to about 70% chlorine by weight, selected from the group consisting of chlorinated biphenyl, chlorinated triphenyl and blends of chlorinated biphenyl and chlorinated triphenyl.

2. The intermediate of claim 1 wherein the by weight percentage of said chlorinated polyphenyl compound is from about 5% to about 25%.

3. The method of preparing an easily stabilizable intermediate for the preparation of stabilized poly-α-olefin shaped articles which consists of
   (A) mixing a particulate poly-α-olefin and a chlorinated polyphenyl solution in an amount to provide from about 1% to about 30% by weight add-on of chlorinated polyphenyl, and
   (B) baking said mixture at a temperature of from about 150° F. to about 300° F. for a period of from about ½ hour to about 8 hours whereby the poly-α-olefin uniformly absorbs said chlorinated polyphenyl.

4. An easily stabilizable intermediate for the preparation of stabilized polypropylene compositions which consists essentially of an isotactic polypropylene and from about 1% to about 30% by weight of any chlorinated polyphenyl compound, having from about 20% to about 70% chlorine by weight, selected from the group consisting of chlorinated biphenyl, chlorinated triphenyl, and blends of chlorinated biphenyl and chlorinated triphenyl.

5. An easily stabilizable intermediate for the preparation of stabilized high density polyethylene compositions which consists essentially of a high density polyethylene and from about 1% to about 30% by weight of any chlorinated polyphenyl compound, having from about 20% to about 70% chlorine by weight, selected from the group consisting of chlorinated biphenyl, chlorinated triphenyl, and blends of chlorinated biphenyl and chlorinated triphenyl.

6. The method of preparing an easily stabilizable intermediate for the preparation of stabilized polypropylene shaped articles which consists essentially of:
 (A) mixing a particulate isotactic polypropylene and a chlorinated polyphenyl solution in an amount to provide from about 1% to about 30% by weight add-on of chlorinated polyphenyl, and
 (B) baking said mixture at a temperature of from about 150° F. to about 300° F. for a period of from about ½ hour to about 8 hours whereby the isotactic polypropylene uniformly absorbs said chlorinated polyphenyl.

7. The method of preparing an easily stabilizable intermediate for the preparation of stabilized high density polyethylene shaped articles which consists essentially of:
 (A) mixing a particulate high density polyethylene and a chlorinated polyphenyl solution in an amount to provide from about 1% to about 30% by weight add-on of chlorinated polyphenyl, and
 (B) baking said mixture at a temperature of from about 150° F. to about 300° F. for a period of from about ½ hour to about 8 hours whereby the high density polyethylene uniformly absorbs said chlorinated polyphenyl.

References Cited

UNITED STATES PATENTS 3,277,046   10/1966   Listner.

FOREIGN PATENTS 625,759   1963   Belgium.
1,028,723   4/1958   Germany.

DONALD E. CZAJA, Primary Examiner.

V. P. HOKE, Assistant Examiner.

U.S. Cl. X.R.

260—45.7, 45.75, 45.8, 45.85, 45.9, 45.95